United States Patent
Liu et al.

(10) Patent No.: US 10,951,509 B1
(45) Date of Patent: Mar. 16, 2021

(54) METHODS, SYSTEMS, AND COMPUTER READABLE MEDIA FOR PROVIDING INTENT-DRIVEN MICROAPPS FOR EXECUTION ON COMMUNICATIONS NETWORK TESTING DEVICES

(71) Applicant: Keysight Technologies, Inc., Santa Rosa, CA (US)

(72) Inventors: Winston Wencheng Liu, Woodland Hills, CA (US); Kristopher Len Raney, Oak Park, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/434,825

(22) Filed: Jun. 7, 2019

(51) Int. Cl.
*H04L 12/26* (2006.01)
*H04L 12/24* (2006.01)
*G06F 40/30* (2020.01)

(52) U.S. Cl.
CPC .......... *H04L 43/50* (2013.01); *H04L 41/0893* (2013.01); *H04L 41/22* (2013.01); *H04L 43/04* (2013.01); *G06F 40/30* (2020.01)

(58) Field of Classification Search
CPC ... H04L 63/10; H04L 41/0869; H04L 43/045; H04L 51/046; H04L 43/50; H04L 41/20; H04L 43/14; H04L 67/10; G06F 8/65; G06F 11/3688; G06F 11/3664; G06F 11/3692; G06F 11/3476; G06F 11/3636; G06F 2201/86; G06F 8/60
See application file for complete search history.

(56) References Cited

U.S. PATENT DOCUMENTS

| | | |
|---|---|---|
| 6,574,661 B1 | 6/2003 | Delano et al. |
| 6,718,535 B1 | 4/2004 | Underwood |
| 7,089,316 B2 | 8/2006 | Andersen et al. |
| 7,100,195 B1 | 8/2006 | Underwood |

(Continued)

FOREIGN PATENT DOCUMENTS

WO   WO 2018/149498 A1   8/2018

OTHER PUBLICATIONS

Commonly-assigned, co-pending U.S. Appl. No. 16/219,888, for "Methods Systesm, and Computer Readable Media for Managing Deployment and Maintenance of Network Tools," (Unpublished, filed Dec. 13, 2018).

(Continued)

*Primary Examiner* — Hitesh Patel

(57) ABSTRACT

Methods, systems, and computer readable media for providing intent-driven microapps for execution on communications network testing devices. A method includes receiving a configuration definition specifying a user-declared intent for testing a communications network. The method includes accessing a catalog of intents and determining, based on one or more entries in the catalog of intents matching the configuration definition specifying the user-declared intent, one or more applications from a repository of network testing or visibility applications and at least one configuration file. The method includes installing the one or more applications on a network testing device and configuring the one or more applications using the configuration file, causing the network testing device to test the communications network and to fulfill the user-declared intent specified in the configuration definition.

15 Claims, 4 Drawing Sheets

(56) References Cited

U.S. PATENT DOCUMENTS

| | | | |
|---|---|---|---|
| 7,284,234 B2 | 10/2007 | Steg et al. | |
| 7,466,710 B1 | 12/2008 | Clemm et al. | |
| 7,526,681 B2 * | 4/2009 | Anafi | G06F 11/3664 |
| | | | 714/38.14 |
| 7,899,846 B2 | 3/2011 | Flynn et al. | |
| 8,316,438 B1 | 11/2012 | Bush et al. | |
| 8,458,111 B2 | 6/2013 | Wolf et al. | |
| 8,869,107 B2 | 10/2014 | Taylor et al. | |
| 9,043,747 B2 | 5/2015 | Eksten et al. | |
| 9,047,414 B1 * | 6/2015 | Matyjek | G06F 11/3688 |
| 9,077,760 B2 | 7/2015 | McKeown et al. | |
| 9,575,732 B2 | 2/2017 | Welicki et al. | |
| 9,760,928 B1 | 9/2017 | Ward, Jr. et al. | |
| 9,818,127 B2 | 11/2017 | Iyoob et al. | |
| 9,875,087 B2 | 1/2018 | Scholz et al. | |
| 10,338,958 B1 | 7/2019 | Kamboj et al. | |
| 10,733,088 B1 | 8/2020 | Sommers | |
| 2001/0052013 A1 | 12/2001 | Munguia et al. | |
| 2002/0174180 A1 | 11/2002 | Brown et al. | |
| 2004/0117802 A1 | 6/2004 | Green | |
| 2004/0153863 A1 * | 8/2004 | Klotz | H04L 41/12 |
| | | | 714/45 |
| 2005/0076113 A1 * | 4/2005 | Klotz | H04L 43/00 |
| | | | 709/224 |
| 2007/0234293 A1 * | 10/2007 | Noller | G06F 11/3688 |
| | | | 717/124 |
| 2008/0201468 A1 | 8/2008 | Titus | |
| 2009/0112683 A1 | 4/2009 | Hamilton, II et al. | |
| 2010/0115606 A1 | 5/2010 | Samovskiy et al. | |
| 2010/0318974 A1 | 12/2010 | Hrastnik et al. | |
| 2011/0231552 A1 | 9/2011 | Carter et al. | |
| 2011/0235991 A1 | 9/2011 | Luthra et al. | |
| 2012/0089727 A1 | 4/2012 | Raleigh et al. | |
| 2012/0185913 A1 | 7/2012 | Martinez et al. | |
| 2012/0191545 A1 | 7/2012 | Leibu et al. | |
| 2013/0262931 A1 | 10/2013 | Siddalingesh | |
| 2014/0006597 A1 | 1/2014 | Ganguli et al. | |
| 2014/0026122 A1 | 1/2014 | Markande et al. | |
| 2014/0047342 A1 | 2/2014 | Breternitz et al. | |
| 2014/0215450 A1 | 7/2014 | Salisbury et al. | |
| 2014/0278623 A1 | 9/2014 | Martinez et al. | |
| 2014/0278808 A1 | 9/2014 | Iyoob et al. | |
| 2015/0052499 A1 | 2/2015 | Finch et al. | |
| 2015/0324182 A1 | 11/2015 | Barros et al. | |
| 2015/0339107 A1 | 11/2015 | Krishnamurthy et al. | |
| 2017/0090463 A1 | 3/2017 | Wang | |
| 2017/0171033 A1 | 6/2017 | Lucas et al. | |
| 2017/0171034 A1 | 6/2017 | Lucas et al. | |
| 2017/0180318 A1 | 6/2017 | Lutas et al. | |
| 2017/0180567 A1 | 6/2017 | Sharma et al. | |
| 2018/0096105 A1 | 4/2018 | Bleicher et al. | |
| 2018/0152884 A1 | 5/2018 | Hu et al. | |
| 2018/0206100 A1 | 7/2018 | Eisner et al. | |
| 2019/0007453 A1 | 1/2019 | Nimmagadda et al. | |
| 2019/0034957 A1 | 1/2019 | Koryakin et al. | |
| 2019/0052549 A1 | 2/2019 | Duggal et al. | |
| 2019/0238422 A1 | 8/2019 | Raney | |

OTHER PUBLICATIONS

Commonly-assigned, co-pending U.S. Appl. No. 16/653,961 for "Methods, Systems and Computer Readable Media for Providing a Declarative Network Monitoring Environment," (Unpublished, filed Oct. 15, 2019).

"Managed Detection and Response," esentire, Gartner Press Release, pp. 1-11 (Mar. 14, 2017).

Final Office Action for U.S. Appl. No. 16/219,888 (dated Oct. 14, 2020).

Non-Final Office Action for U.S. Appl. No. 16/219,888 (dated Apr. 6, 2020).

* cited by examiner

METHODS, SYSTEMS, AND COMPUTER READABLE MEDIA FOR PROVIDING INTENT-DRIVEN MICROAPPS FOR EXECUTION ON COMMUNICATIONS NETWORK TESTING DEVICES

TECHNICAL FIELD

The subject matter described herein relates to testing communications networks. More particularly, the subject matter described herein relates to methods, systems, and computer readable media for providing intent-driven microapps for execution on communications network testing devices.

BACKGROUND

Packet-based data networks continue to grow in importance, and it is often desirable to monitor network traffic associated with these packet-based networks on an ongoing basis. Network testing often involves introduction of test packets into a network environment, collection of the test packets after they have processed by the network environment, and comparison of the test packets to the processed packets. This comparison can provided information about the functioning of the network, such as packet drops, data corruption, packet delays, and/or other potential error conditions or parameters for the network environment. Network testing applications can be deployed across a variety of runtime environments. For example, active probes, active inline packet analysis modules, and passive packet analysis modules can installed on network testing devices. Providing network test applications, however, may not always be able to directly meet a user's testing needs.

Accordingly, in light of these difficulties there exists a need for improved methods, systems, and computer readable media for providing intent-driven microapps for execution on communications network testing devices.

SUMMARY

The subject matter described herein includes methods, systems, and computer readable media for providing intent-driven microapps for execution on communications network testing devices. A method includes receiving a configuration definition specifying a user-declared intent for testing a communications network. The method includes accessing a catalog of intents and determining, based on one or more entries in the catalog of intents matching the configuration definition specifying the user-declared intent, one or more applications from a repository of network testing or visibility applications and at least one configuration file. The method includes installing the one or more applications on a network testing device and configuring the one or more applications using the configuration file, causing the network testing device to test the communications network and to fulfill the user-declared intent specified in the configuration definition.

In some examples, installing the one or more applications includes installing at least first and second applications and configuring the first application to emit one or more events to an event bus and configuring the second application to consume the one or more events in the course of fulfilling the user-declared intent specified in the configuration definition. Installing the one or more applications can include configuring the one or more applications to expose, to one or more other applications executing on the network testing device, at least one of: multi-dimensional metrics, logs, and traces.

In some examples, receiving the configuration definition specifying the user-declared intent includes providing a user interface configured for displaying a plurality of available declarative statements and receiving the configuration definition through the user interface. Accessing a catalog of intents can include parsing the configuration definition to identify a natural language-based network performance intent.

In some examples, receiving the configuration definition specifying the user-declared intent includes receiving one or more operational, monitoring, or testing intents, and causing the network testing device to test the communications network and to fulfill the user-declared intent specified in the configuration definition includes installing the one or more applications to continuously execute in accordance with the one or more operational monitoring, or testing intents. Configuring the one or more applications can include configuring the one or more applications to generate execution trace information and to publish the execution trace information to a trace module configured to export the execution trace information to a trace consumer module The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

The subject matter described herein relates to methods, systems, and computer readable media for providing intent-driven microapps for execution on communications network testing devices.

In some conventional systems for delivering applications to network testing devices, the system delivers a generic application to the user. The system then leaves it up to the user to configure the application, e.g., a test/probe for voice quality over numerous other tests/options, and to set up alerts/events to be fired based on the metrics that these tests will produce. In contrast, the systems and methods described in this specification allow the user to make the intent declarative.

Figure 1:
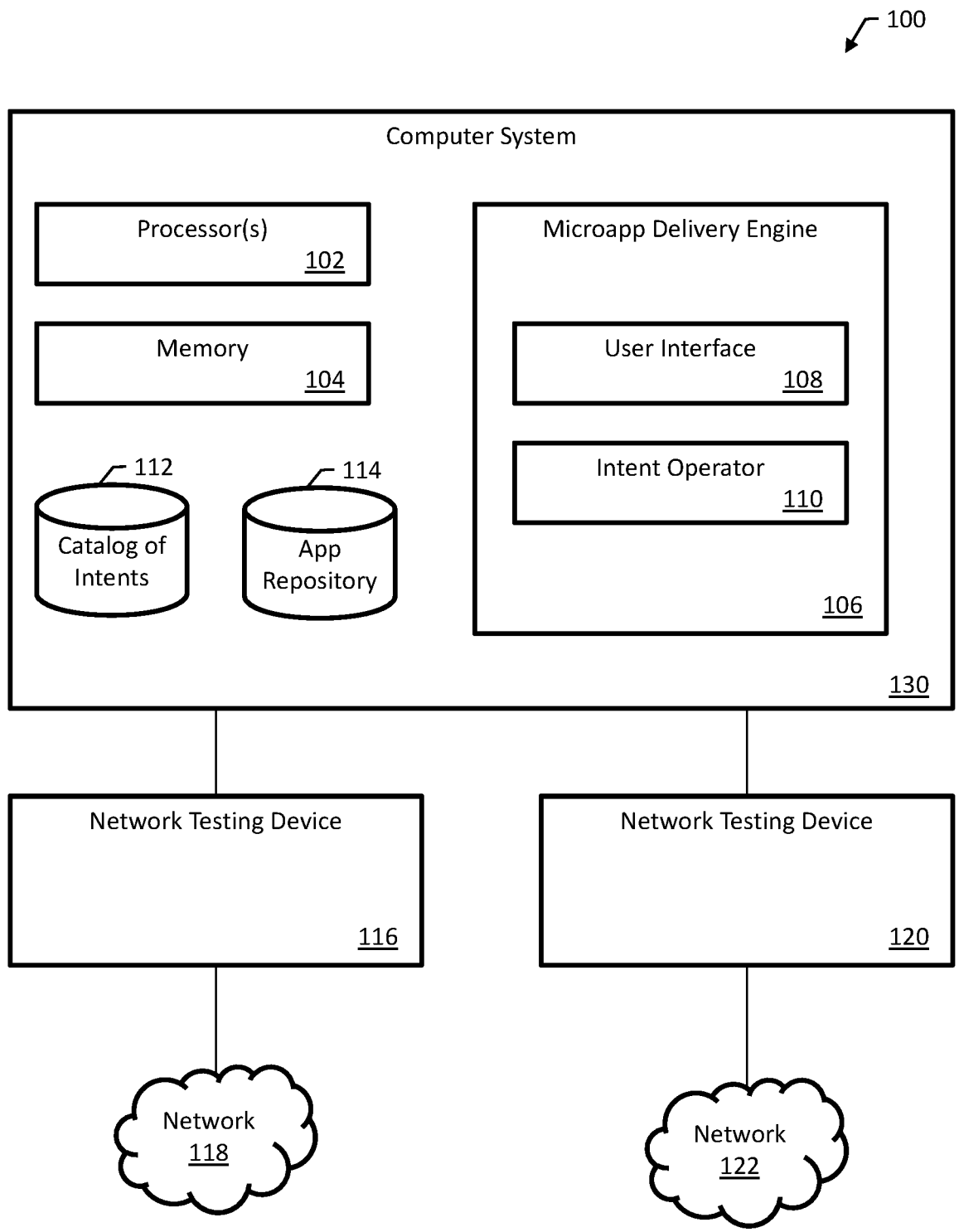
FIG. 1 illustrates an example network testing environment including a computer system configured for providing intent-driven microapps for execution on communications network testing devices.

FIG. 1 illustrates an example network testing environment 100 including a computer system 130 configured for providing intent-driven microapps for execution on communications network testing devices. Computer system 130 includes one or more processors 102 and memory 104 storing executable instructions for processors 102. For example, computer system 130 can be implemented as a microapp server configured to distribute microapps to network testing devices, e.g., via the Internet.

Network testing environment 100 includes network testing devices 116 and 120. Network testing devices 116 and 120 can be, e.g., computer systems configured to perform conventional network testing operations or to perform network monitoring and visibility operations. Network testing device 116 is configured for testing a first network 118, and network testing device 120 is configured for testing a second network 122. Although only two network testing devices are shown, network testing environment 100 can include many different network testing devices, which in turn can be used for network testing on many different data communications networks.

Computer system 130 includes a microapp delivery engine 106. Microapp delivery engine 106 is configured for distributing microapps to network testing devices 116 and 120. Instead of delivering generic applications, microapp delivery engine 106 can install and configure particular applications to fulfill user-declared intentions for network testing. This can be useful, e.g., to relieve the user of the need to select and configure the applications and to set up alerts or events or both to carry out specific kinds of network tests.

For example, consider the user-declared intent statement that "the voice quality score between Site A and Site B must be 'x' for the 95th percentile over 'y' interval." Based on this intent, microapp delivery engine 106 can deliver one or more applications with the tests needed to ensure this intent is configured, and microapp delivery engine 106 can configure the applications to continuously run to fulfill the intent. The microapp can also preconfigure these events, so that additional actions can be taken/chained. Each application of a number of application of applications can be chained as a "microapp" and can then be aligned to the end user intent in a declarative way.

In some examples, microapp delivery engine 106 and network testing devices 116 and 120 are configured to provide microapps a way to emit events to event consumers, i.e., other microapps which can be preconfigured against an event context that triggered an event. In general, microapps will expose multi-dimensional metrics, logs and traces, which can be consumed by metrics/logs/traces consumers. Microapp delivery engine 106 can be used, e.g., to implement a marketplace with targeted microapps aligned to different end-user use cases, even though the underlying applications for each microapp may ultimately re-use the same technology.

Microapp delivery engine 106 includes a user interface 108 and an intent operator 110. User interface 108 can be implemented, e.g., by sending a web page to a user device, causing the user device to display available declarative statements on a display to a user. User interface 108 can include a graphical user interface portion, and user interface 108 can be configured for receiving user input specifying a user-declared intent for testing a communications network. User interface 108 can be used for specifically configuring certain network testing devices, e.g., by specifying device identifiers or network addresses for deployed network testing devices.

In general, user interface 108 is configured for receiving a configuration definition specifying a user-declared intent for testing a communications network. The configuration definition can be, e.g., a text string or an alphanumeric identifier or any appropriate type of data. For example, receiving the text string can include receiving the text string from a client device displaying a user interface to a user. The user can specify the user-declared intent in any appropriate way, e.g., by typing the text string with a user input device or by entering a speech utterance to a speak-to-text module or by selecting items from a graphical portion of the user interface.

Intent operator 110 is configured for accessing a catalog of intents 112 and determining, based on one or more entries in catalog of intents 112 matching the text string specifying the user-declared intent, one or more applications from a repository 114 of network testing applications and at least one configuration file. Catalog of intents 112 can be implemented, e.g., as a database relating available declarative statements to microapps. An entry for an available declarative statement then would specify a corresponding microapp for fulfilling a user-declared intent.

In some examples, a user can specify a user-declared intent with a natural language-based network performance intent. Then, accessing catalog of intents 112 can include parsing the text string to identify the natural language-based network performance intent and then matching the intent in catalog of intents 112.

Intent operator 110 is configured for installing applications from repository 112 on network testing devices 116 and 120 and configuring the applications using configuration files. Intent operator 110 causes network testing devices 116 and 120 to test communications networks 118 and 122 and to fulfill the user-declared intent specified in the text string.

Installing the applications can include installing several applications and configuring the applications to emit events to an event bus. Then, installing the applications can include configuring some of the applications to consume events from the event bus in the course of fulfilling a user-declared intent. Installing the applications can include configuring the applications to expose, to other applications executing on the network testing device, multi-dimensional metrics, logs, and traces. In some examples, configuring the applications includes configuring the applications to generate execution trace information and to publish the execution trace information to a trace module configured to export the execution trace information to a trace consumer module.

Fulfilling the user-declared intent can include causing the network testing device to continuously execute microapps and, e.g., provide test results or alerts when an aspect of the communications network or the network testing device is not operating in accordance with the user-declared intent. For example, the user-declared intent can specify operational, monitoring, or testing intents. Then, microapp delivery engine 106 can install applications to continuously execute in accordance with the one or more operational monitoring, or testing intents.

Figure 2:
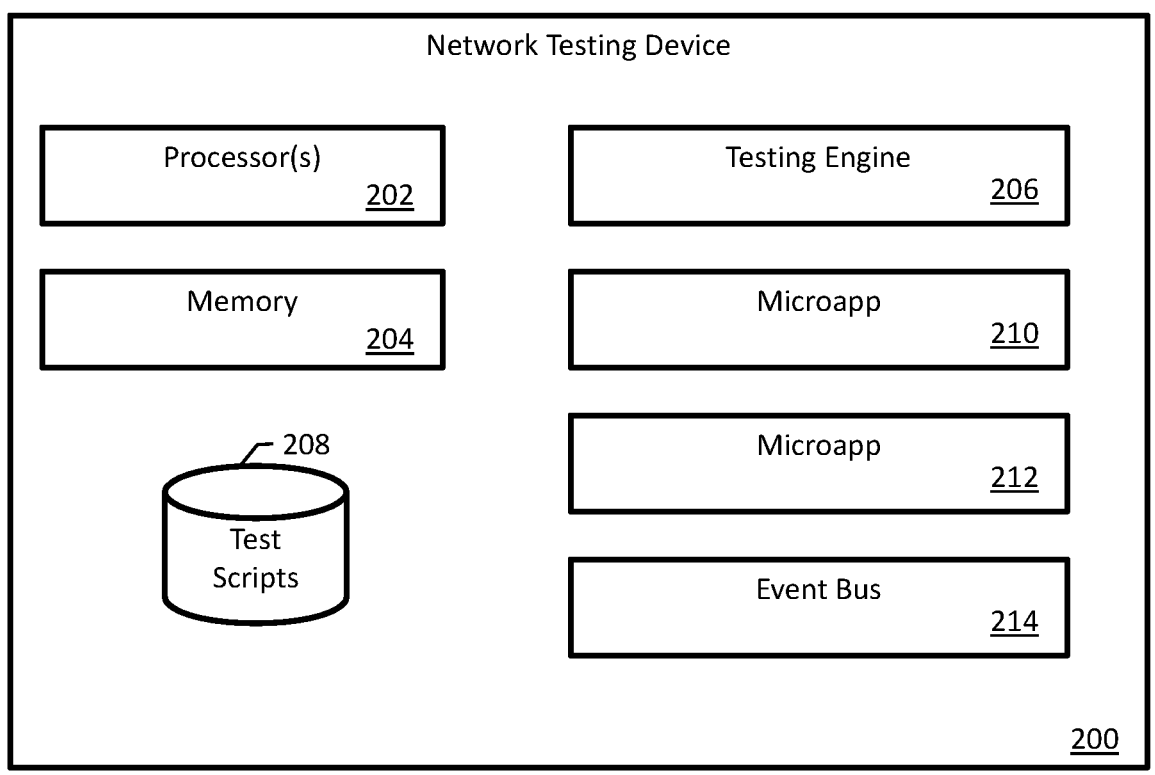
FIG. 2 is a block diagram of an example network testing device.

FIG. 2 is a block diagram of an example network testing device 200. Network testing device 200 includes one or more processors 202 and memory 204 storing executable instructions for processors 202.

Network testing device 200 can include a testing engine 206 and a repository 208 of test scripts. Testing engine 206 executes test scripts to test communications networks. For example, testing engine 206 can generate and transmit network traffic, review responsive network traffic, and then analyze the responsive network traffic to produce test results. Testing engine 206 can be configured to test one or more specific devices within a network or to test network operations more generally.

Although network testing device 200 is shown with testing engine 206, in some examples, network testing device 200 is configured for network monitoring or network visibility or both. For example, network testing device 200 can include a networking monitoring and visibility engine instead of or in addition to testing engine 206.

Network testing device 200 is configurable by virtue of supporting installation of microapps. For example, network testing device 200 is shown with two installed microapps 210 and 212. The microapp delivery engine 106 of FIG. 1 can install microapps 210 and 212 and configure microapps 210 and 212 to perform specific network testing operations. Microapp delivery engine 106 can configure microapps 210 and 212 to emit events on an event bus 214. Microapps 210 and 212 can then consume events from event bus 214.

Figure 3:
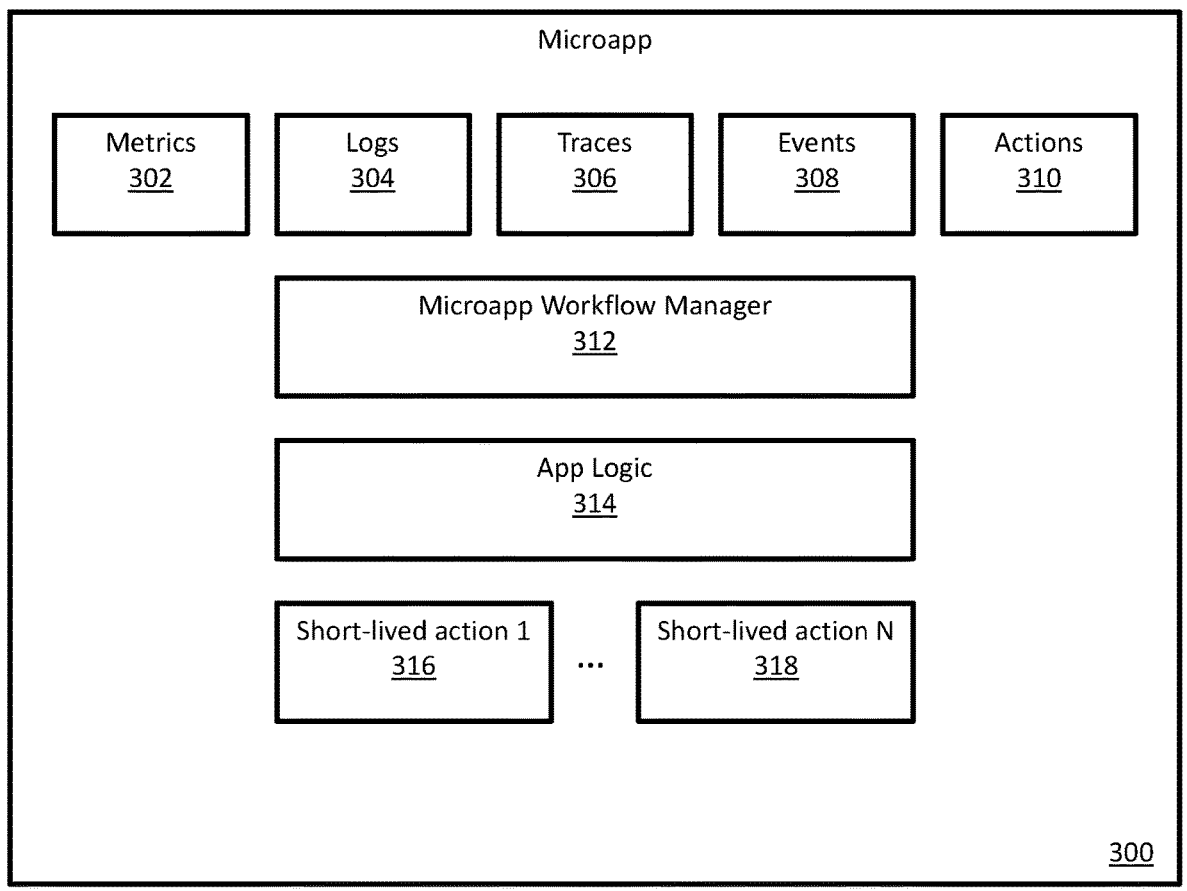
FIG. 3 is a block diagram of an example microapp.

FIG. 3 is a block diagram of an example microapp 300. Microapp 300 can be implemented as one or more software applications and one or more configuration files specifying configuration data or configuration instructions or both.

In general, a microapp can be defined by, for example, one or more of:
- a specific business workflow, composed of events (this can be external events, timer based, or events as a consequence of workflow transition)
- a set of actions that can be triggered by an external event source
- a set of events that it can export to be acted on directly or via an event bus
- metrics, logs, traces relevant to the business workflow/actions that can be retrieved/filtered by an external entity A user-declared intent can specify either a single microapp or a chained sequence of two or more microapps, where events from a microapp in the sequence are consumed by actions in another microapp in the sequence. Microapps can be executed independently or concurrently.

Microapp 300 includes a metrics module 302. Metrics module 302 is configured for generating and exporting various metrics associated with the device or system under test. For example, the metrics may be exported to a metrics consumer module, such as a cloud data store, from which a user may access the metric data (e.g., via a pub/sub, real-time streaming, or other interface). In an example where microapp 300 is monitoring voice quality, the metrics could include one or more of the following: voice quality ensure request count, voice quality ensure response count, and voice quality ensure duration bucket.

Microapp 300 includes a log module 304. Log module 304 is configured for generating micro app log information associated with the operation of the micro app and its components. Log module 304 may export the log information to a log consumer module, such as a cloud data store, from which a user may access the log data (e.g., via a pub/sub, real-time streaming, or other interface). Typically, the logs will include contextual information about the environment that the app happens to run in (e.g., geographic location, site name, user provided meta data when it launched the microapp, in case the multiple instances of the same microapp is launched in the same site).

Microapp 300 includes a trace module 306. Trace module 306 is configured for generating execution trace information associated with the operation of the micro app and its components. Trace module 306 may export the trace information to a trace consumer module, such as a cloud data store, from which a customer/user may access the log data (e.g., via a pub/sub, real-time streaming, or other interface).

In some examples, trace module 306 is used to get visibility into the time spent in each microapp when you have a user-declared intent that is fulfilled by a chain of microapps. For example, consider a scenario where a user-declared intent calls for a chain of a first microapp generating some events as input to actions of a second microapp, and the microapps are independently deployed. In order to track the execution of an iteration of the reconciliation of looking at a current state against the user-declared intent and drive the system to the desired intent, it may be useful to trace each iteration going across both the first and second microapps. The traces can be sampled or triggered on the fly during debugging, for example.

Microapp 300 includes an event module 308. Event module 308 is configured for generating an event, which can be exported and acted upon by other components of the micro app platform & associated micro apps. Event module 308 may export events, e.g., via the event bus 214 of FIG. 2. In an example where microapp 300 is monitoring voice quality, an event could be an IntentNotMet event, e.g., as structured data that contains metadata/context to the parameters fed into the microapp. For example, the data could be structured as: {event: "IntentNotMet", intent: "VoiceQuality", Environments: [("SiteA", "SiteB")], EventTime: "when this happened"}.

Microapp 300 includes an action module 310. Action module 310 is configured for handling events that may be either internally or externally generated. For example, an action could be triggering the deployment/execution of another micro app.

For example, suppose that a first microapp generates an IntentNotMet event that explicitly triggers a set of diagnostics using a second microapp, e.g., to do path analysis between site A and Site B. In that case, the first microapp may need to perform an action to take the event from the first microapp and adapt it, e.g., to a proper input format for the second microapp. Or alternatively, if the second microapp that does path analysis is configured to consume events from the first microapp, the second microapp can implement the action that handles the event output from the first microapp natively and take on the burden of doing the adaptation.

Microapp 300 includes a microapp workflow manager 312. Workflow manager 312 is configured to execute logic from an application logic module 314. Workflow manager 312 can be a layer that interfaces to metric module 302, log module 304, trace module 306, event module 308, and action module 310. Microapp 300 includes a number of short-lived actions 316 and 318. Short-lived actions 316 and 318 can be, e.g., instances of the steps expressed by application logic 314.

Application logic module 314 can provide, e.g., logic definitions such as a business logic definitions. An example business logic workflow for a voice quality intent would be: if there is a program already built for this purpose and delivered as a docker image, the business logic can execute a voice quality image that takes 3 parameters (Score, Src-Site, and DstSite) at each [time interval] for [total time] and alert if [all/%] intent are not met. The business logic/workflow definition can include: 1. For [total time], run

[image] with target[Score] from [SrcSite] to [DstSite] 2. If all runs reported fail, generate IntentNotMet event.

Consider another example of application logic. Suppose that the voice quality image came from a 3rd party, and we have something to run for different encoding (e.g., voicequalityDiff (Score, Encoding, SrcSite, and DstSite), the logic might become: First, run [voicequalityimage] with target [Score] from [SrcSite] to [DstSite], then run [voicequalityimageDiff] for [Encoding] with target [Score] from [SrcSite] to [DstSite].

Figure 4:
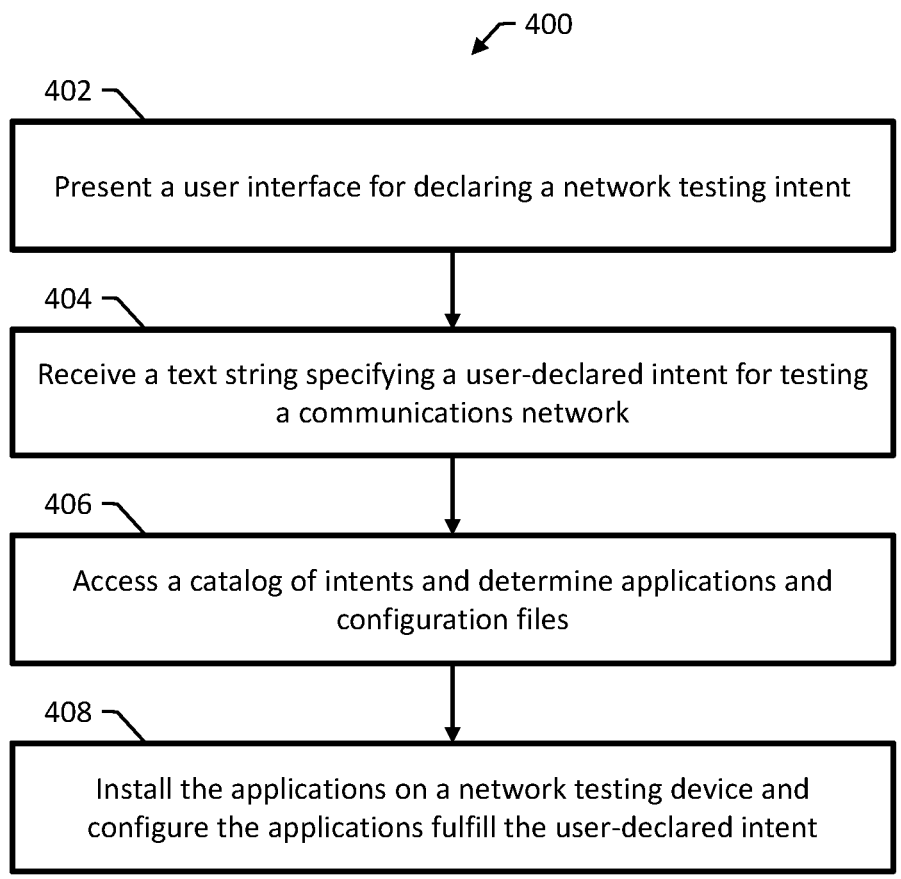
FIG. 4 is a flow chart of an example method for providing intent-driven microapps for execution on communications network testing devices.

FIG. 4 is a flow chart of an example method 400 for providing intent-driven microapps for execution on communications network testing devices. Method 400 can be performed, e.g., by the microapp delivery engine 106 of FIG. 1.

Method 400 includes presenting a user interface for declaring a network testing intent (402). For example, method 400 can include sending a web page to a user device, causing the user device to display available declarative statements on a display to a user.

Method 400 includes receiving a configuration definition specifying a user-declared intent for testing a communications network (404). The configuration definition can be, e.g., a text string or an alphanumeric identifier or any appropriate type of data. For example, receiving the text string can include receiving the text string from a client device displaying a user interface to a user. The user can specify the user-declared intent in any appropriate way, e.g., by typing the text string with a user input device or by entering a speech utterance to a speak-to-text module or by selecting items from a graphical portion of the user interface.

Method 400 includes accessing a catalog of intents and determining, based on one or more entries in the catalog of intents matching the text string specifying the user-declared intent, one or more applications from a repository of network testing or visibility applications and at least one configuration file (406). The catalog of intents can be implemented, e.g., as a database relating available declarative statements to microapps. An entry for an available declarative statement then would specify a corresponding microapp for fulfilling a user-declared intent. In some examples, accessing a catalog of intents includes parsing the text string to identify a natural language-based network performance intent.

Method 400 includes installing the one or more applications on a network testing device and configuring the one or more applications using the configuration file, causing the network testing device to test the communications network and to fulfill the user-declared intent specified in the text string (408). Installing the applications can include installing at least first and second applications and configuring the first application to emit one or more events to an event bus and configuring the second application to consume the one or more events in the course of fulfilling the user-declared intent specified in the text string. Installing the applications can include configuring the one or more applications to expose, to one or more other applications executing on the network testing device, multi-dimensional metrics, logs, and traces. In some examples, configuring the applications includes configuring the one or more applications to generate execution trace information and to publish the execution trace information to a trace module configured to export the execution trace information to a trace consumer module.

Fulfilling the user-declared intent can include causing the network testing device to continuously execute microapps and, e.g., provide test results or alerts when an aspect of the communications network or the network testing device is not operating in accordance with the user-declared intent. For example, receiving the text string specifying the user-declared intent can include receiving one or more operational, monitoring, or testing intents. Then, causing the network testing device to test the communications network and to fulfill the user-declared intent specified in the text string can include installing the one or more applications to continuously execute in accordance with the one or more operational monitoring, or testing intents.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for providing intent-driven microapps for execution on communications network testing devices, the method comprising:

receiving, by a microapp delivery engine executing on a computer system comprising one or more, a configuration definition specifying a user-declared intent for testing a communications network;

accessing, by the microapp delivery engine, a catalog of intents and determining, based on one or more entries in the catalog of intents matching the configuration definition specifying the user-declared intent, one or more applications from a repository of network testing or visibility applications and at least one configuration file; and installing, by the microapp delivery engine, the one or more applications on a network testing device and configuring the one or more applications using the configuration file, causing the network testing device to test the communications network and to fulfill the user-declared intent specified in the configuration definition;

wherein installing the one or more applications comprises installing at least first and second applications and configuring the first application to emit one or more events to an event bus and configuring the second application to consume the one or more events in the course of fulfilling the user-declared intent specified in the configuration definition; and wherein installing the one or more applications comprises configuring the one or more applications to expose, to one or more other applications executing on the network testing device, at least one of: multi-dimensional metrics, logs, and traces.

2. The method of claim 1, wherein receiving the configuration definition specifying the user-declared intent comprises providing a user interface configured for displaying a plurality of available declarative statements and receiving the configuration definition through the user interface.

3. The method of claim 1, wherein accessing a catalog of intents comprises parsing the configuration definition to identify a natural language-based network performance intent.

4. A method for providing intent-driven microapps for execution on communications network testing devices, the method comprising:
    receiving, by a microapp delivery engine executing on a computer system comprising one or more, a configuration definition specifying a user-declared intent for testing a communications network;
    accessing, by the microapp delivery engine, a catalog of intents and determining, based on one or more entries in the catalog of intents matching the configuration definition specifying the user-declared intent, one or more applications from a repository of network testing or visibility applications and at least one configuration file; and
    installing, by the microapp delivery engine, the one or more applications on a network testing device and configuring the one or more applications using the configuration file, causing the network testing device to test the communications network and to fulfill the user-declared intent specified in the configuration definition;
    wherein receiving the configuration definition specifying the user-declared intent comprises receiving one or more operational, monitoring, or testing intents, and wherein causing the network testing device to test the communications network and to fulfill the user-declared intent specified in the configuration definition comprises installing the one or more applications to continuously execute in accordance with the one or more operational monitoring, or testing intents; and
    wherein installing the one or more applications comprises configuring the one or more applications to expose, to one or more other applications executing on the network testing device, at least one of: multi-dimensional metrics, logs, and traces.

5. The method of claim 1, wherein configuring the one or more applications comprises configuring the one or more applications to generate execution trace information and to publish the execution trace information to a trace module configured to export the execution trace information to a trace consumer module.

6. A system for providing intent-driven microapps for execution on communications network testing devices, the system comprising:
    one or more processors and memory storing instructions for the one or more processors; and
    a microapp delivery engine configured for performing operations comprising:
        receiving a configuration definition specifying a user-declared intent for testing a communications network;
        accessing a catalog of intents and determining, based on one or more entries in the catalog of intents matching the configuration definition specifying the user-declared intent, one or more applications from a repository of network testing or visibility applications and at least one configuration file; and
        installing the one or more applications on a network testing device and configuring the one or more applications using the configuration file, causing the network testing device to test the communications network and to fulfill the user-declared intent specified in the configuration definition;
    wherein installing the one or more applications comprises installing at least first and second applications and configuring the first application to emit one or more events to an event bus and configuring the second application to consume the one or more events in the course of fulfilling the user-declared intent specified in the configuration definition;
    wherein installing the one or more applications comprises configuring the one or more applications to expose, to one or more other applications executing on the network testing device, at least one of: multi-dimensional metrics, logs, and traces.

7. The system of claim 6, wherein receiving the configuration definition specifying the user-declared intent comprises providing a user interface configured for displaying a plurality of available declarative statements and receiving the configuration definition through the user interface.

8. The system of claim 6, wherein accessing a catalog of intents comprises parsing the configuration definition to identify a natural language-based network performance intent.

9. A system for providing intent-driven microapps for execution on communications network testing devices, the system comprising:
    one or more processors and memory storing instructions for the one or more processors; and
    a microapp delivery engine configured for performing operations comprising:
        receiving a configuration definition specifying a user-declared intent for testing a communications network;
        accessing a catalog of intents and determining, based on one or more entries in the catalog of intents matching the configuration definition specifying the user-declared intent, one or more applications from a repository of network testing or visibility applications and at least one configuration file; and
        installing the one or more applications on a network testing device and configuring the one or more applications using the configuration file, causing the network testing device to test the communications network and to fulfill the user-declared intent specified in the configuration definition;
    wherein receiving the configuration definition specifying the user-declared intent comprises receiving one or more operational, monitoring, or testing intents, and wherein causing the network testing device to test the communications network and to fulfill the user-declared intent specified in the configuration definition comprises installing the one or more applications to continuously execute in accordance with the one or more operational monitoring, or testing intents, and wherein installing the one or more applications comprises configuring the one or more applications to expose, to one or more other applications executing on the network testing device, at least one of: multi-dimensional metrics, logs, and traces.

10. The system of claim 6, wherein configuring the one or more applications comprises configuring the one or more applications to generate execution trace information and to publish the execution trace information to a trace module configured to export the execution trace information to a trace consumer module.

11. A non-transitory computer readable medium comprising computer executable instructions embodied in the non-transitory computer readable medium that when executed by at least one processor of at least one computer cause the at least one computer to perform steps comprising:

receiving a configuration definition specifying a user-declared intent for testing a communications network;

accessing a catalog of intents and determining, based on one or more entries in the catalog of intents matching the configuration definition specifying the user-declared intent, one or more applications from a repository of network testing or visibility applications and at least one configuration file; and installing the one or more applications on a network testing device and configuring the one or more applications using the configuration file, causing the network testing device to test the communications network and to fulfill the user-declared intent specified in the configuration definition;

wherein installing the one or more applications comprises installing at least first and second applications and configuring the first application to emit one or more events to an event bus and configuring the second application to consume the one or more events in the course of fulfilling the user-declared intent specified in the configuration definition; and wherein installing the one or more applications comprises configuring the one or more applications to expose, to one or more other applications executing on the network testing device, at least one of: multi-dimensional metrics, logs, and traces.

12. The non-transitory computer readable medium of claim 11, wherein installing the one or more applications comprises configuring the one or more applications to expose, to one or more other applications executing on the network testing device, at least one of: multi-dimensional metrics, logs, and traces.

13. The non-transitory computer readable medium of claim 11, wherein receiving the configuration definition specifying the user-declared intent comprises providing a user interface configured for displaying a plurality of available declarative statements and receiving the configuration definition through the user interface.

14. The non-transitory computer readable medium of claim 11, wherein accessing a catalog of intents comprises parsing the configuration definition to identify a natural language-based network performance intent.

15. The non-transitory computer readable medium of claim 11, wherein receiving the configuration definition specifying the user-declared intent comprises receiving one or more operational, monitoring, or testing intents, and wherein causing the network testing device to test the communications network and to fulfill the user-declared intent specified in the configuration definition comprises installing the one or more applications to continuously execute in accordance with the one or more operational monitoring, or testing intents.

* * * * *